US008953501B2

(12) United States Patent
Hillis et al.

(10) Patent No.: US 8,953,501 B2
(45) Date of Patent: Feb. 10, 2015

(54) IMS APPLICATION SEQUENCING OPTIMIZER

(75) Inventors: Brian Hillis, Centennial, CO (US); Renato P. Simoes, Fortaleza (BR); Pier Tognini, Goiania (BR)

(73) Assignee: Avaya Inc., Basking Ridge, NJ (US)

( * ) Notice: Subject to any disclaimer, the term of this patent is extended or adjusted under 35 U.S.C. 154(b) by 524 days.

(21) Appl. No.: 13/073,692

(22) Filed: Mar. 28, 2011

(65) Prior Publication Data

US 2012/0250675 A1  Oct. 4, 2012

(51) Int. Cl.
 *H04L 12/16* (2006.01)
 *H04L 12/66* (2006.01)
(52) U.S. Cl.
 CPC ........................................ *H04L 12/66* (2013.01)
 USPC ............ 370/259; 370/252; 370/352; 455/403
(58) Field of Classification Search
 USPC ................... 370/259, 352; 455/403
 See application file for complete search history.

(56) References Cited

U.S. PATENT DOCUMENTS

| | | | | |
|---|---|---|---|---|
| 6,832,254 B1 * | 12/2004 | Scoggins et al. | | 709/227 |
| 7,664,102 B1 * | 2/2010 | Samarasinghe | | 370/352 |
| 2004/0196867 A1 * | 10/2004 | Ejzak et al. | | 370/468 |
| 2006/0203749 A1 * | 9/2006 | Tseng | | 370/260 |
| 2007/0005770 A1 * | 1/2007 | Kramer et al. | | 709/226 |
| 2007/0121608 A1 * | 5/2007 | Gu et al. | | 370/356 |
| 2008/0162637 A1 * | 7/2008 | Adamczyk et al. | | 709/204 |
| 2009/0196183 A1 * | 8/2009 | Kakadia et al. | | 370/237 |
| 2010/0023627 A1 * | 1/2010 | Froment et al. | | 709/228 |
| 2011/0066694 A1 * | 3/2011 | Barrett et al. | | 709/207 |
| 2011/0164608 A1 * | 7/2011 | Lindgren | | 370/352 |
| 2011/0182283 A1 * | 7/2011 | Van Buren et al. | | 370/352 |
| 2012/0157149 A1 * | 6/2012 | Park et al. | | 455/519 |

* cited by examiner

*Primary Examiner* — Hassan Kizou
*Assistant Examiner* — Deepa Belur
(74) *Attorney, Agent, or Firm* — Sheridan Ross P.C.

(57) ABSTRACT

An application optimizer is disclosed that is configured to optimize the execution of applications in an application sequence. Specifically, two or more applications in an application sequence may include proxy applications that are configured to embed commands into a call-setup message and the application optimizer is configured to parse and execute the commands embedded in the call-setup message as a single Back-to-Back User Agent.

20 Claims, 3 Drawing Sheets

IMS APPLICATION SEQUENCING OPTIMIZER

FIELD OF THE DISCLOSURE

The present disclosure is generally directed toward communication systems and mechanisms for application sequencing within the same.

BACKGROUND

In an IP Multimedia System (IMS) architecture, Session Initiation Protocol (SIP) applications can be invoked from a feature sequencer to perform a service. Many times multiple applications are chained in an application sequence together to perform an array of different services for the caller and/or callee. Depending on the type of service, a SIP application could be implemented as a SIP proxy, a SIP user agent, or a back-to-back user agent (B2BUA). These logical network elements provide different functions.

Generally, a SIP proxy would be used to route a call to a specific destination. For example, an application that interprets the "To", "From" or some custom headers and routes a call accordingly, could be implemented as a SIP proxy.

Alternatively, an application that manages multiple call legs and the state of those call legs must be implemented as a B2BUA, which is more robust and flexible than a simple SIP proxy. Using the previous example, if the application provided music on hold to the caller while it attempted a call to a destination, it would be implemented as a B2BUA.

B2BUA are more common in Enterprise IMS deployments due to the complex contact center and enterprise unified communication scenarios. For example, a contact center may want a caller to hear special announcements while waiting for the next available agent. After the announcements are provided, another application may be invoked to ask the caller if they would participate in survey after the call. This is an example of chaining two applications into a sequence.

Because B2BUAs have to manage the state of multiple call legs, they are often more complex to program as well as being more processor intensive than SIP proxies or user agents. Empirical data suggests that B2BUAs consume roughly four times more processor time than proxies. When multiple B2BUA applications are deployed to the same physical server, the effect can be quite constraining Consider the following comparison:

A single proxy in a single CPU can support 120 call-per-second then—3 chained proxies in a single CPU can support 40 calls-per-second.

A single B2BUA on a single CPU can support 30 calls-per-second then—3 chained B2BUAs can support 10 calls-per-second.

When an application sequence requires multiple B2BUAs to be invoked, the processing delay for the call be become quite noticeable. Specifically, if three B2BUAs are chained in a single application sequence, each of the three B2BUA applications in the sequence would have to implement a similar application framework for managing multiple call legs as well as a similar state machine for dealing with state transitions. This can become quite cumbersome and can restrict the implementation of highly scalable solutions.

SUMMARY

It is with respect to the above issues that the embodiments presented herein were contemplated. This disclosure proposes, among other things, an Application Sequence Optimizer or "Application Optimizer" to minimize the processing overhead associated with utilizing multiple B2BUA applications. Specifically the Application Optimizer can be configured to have the following features/benefits: A) It can assume the role of implementing a communal B2BUA for an entire application sequence instead of each application implementing its own; B) Each application deployed with an Application Optimizer can be developed as a SIP proxy; C) Eliminates the added burden of programing a B2BUA application, which has far more complexity. Instead the complexity is contained within the Application Optimizer code itself functioning as the B2BUA; and/or D) Decreases the amount of processing required by the single Central Processing Unit (CPU). This has the benefit of allowing more applications to be hosted on a single processor.

The Application Optimizer can be provided as a software-based solution that would be deployed with each application sequence that requires a B2BUA. Whereas most IMS applications service users, the Application Optimizer can service other applications in the sequence. Applications that want to take advantage of the Application Optimizer would insert SIP headers that would be interpreted as commands by the Application Optimizer. For example, if an application wished to modify a "From" header (something only a B2BUA could do) it would format a command header specifying a command like CMD-MOD-FROM-USER and supplying the value that the Application Optimizer would modify with. As the application returns control back to the feature sequencer, the next application in the sequence can populate its command header and so on. When the Application Optimizer finally receives the SIP INVITE containing the headers it will execute the relevant B2BUA operation for each specified command.

The following are common B2BUA only functions that could be implemented as commands (issued by proxies):

| Scenario | Sample Command Syntax | Comments |
| --- | --- | --- |
| Modify To header | CMD-MOD-TO-USER/CMD-MOD-TO-DOMAIN | Proxy application would specify user and domain values for the "To" header |
| Modify From header | CMD-MOD-FROM-USER/CMD-MOD-FROM-DOMAIN | Proxy application would specify user and domain values for the "From" header |
| Changing the Call-Id | CMD-MOD-CALL-ID | Application specific need might want to hide the caller's call-Id from the connecting devices (and all the Via headers that goes along the SIP INVITE - for privacy purposes for example) |

-continued

| Scenario | Sample Command Syntax | Comments |
| --- | --- | --- |
| Hiding the Contact header | CMD-FROM-CONTACT | Similar to the above, for privacy of the contacting end points, so they don't see each other details |
| Changing the payload | CMD-ADD-PIDFLO:lat;lon<br>CMD-CLEAN-PIDFLO | This can be used to attach a mime attachment to the payload (beyond the SDP) to carry location information, such as using the standard PIDF-LO that specifies geo location based on latitude and longitude. A command could also do the reverse such as asking the B2B to clean mime attachments and leave just the SDP. |

It should be noted that all the operations listed in the table above are generally only achievable by implementing a B2BUA application (and not a proxy). By executing these operations via the proposed generic B2BUA Application Optimizer, embodiments of the present disclosure allow developers to use this generic/reusable/common application sequence that could simply handle/interpret commands carried in headers. Therefore, the developers can simply code proxy-based applications, which are far simpler to code than a B2BUA.

In some embodiments of the present disclosure, a method is provided that generally comprises:

receiving, at a first application in an application sequence, a call-setup message;

embedding, by the first application, at least one command into the call-setup message to create a first modified call-setup message;

receiving, at a second application in the application sequence, the first modified call-setup message;

embedding, by the second application, at least one command into the first modified call-steup message to create a second modified call-setup message;

receiving, at an application optimizer, the second modified call-setup message; and executing, by the application optimizer, the commands embedded in the second modified call-setup message by the first and second applications.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to implement sequenced applications.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
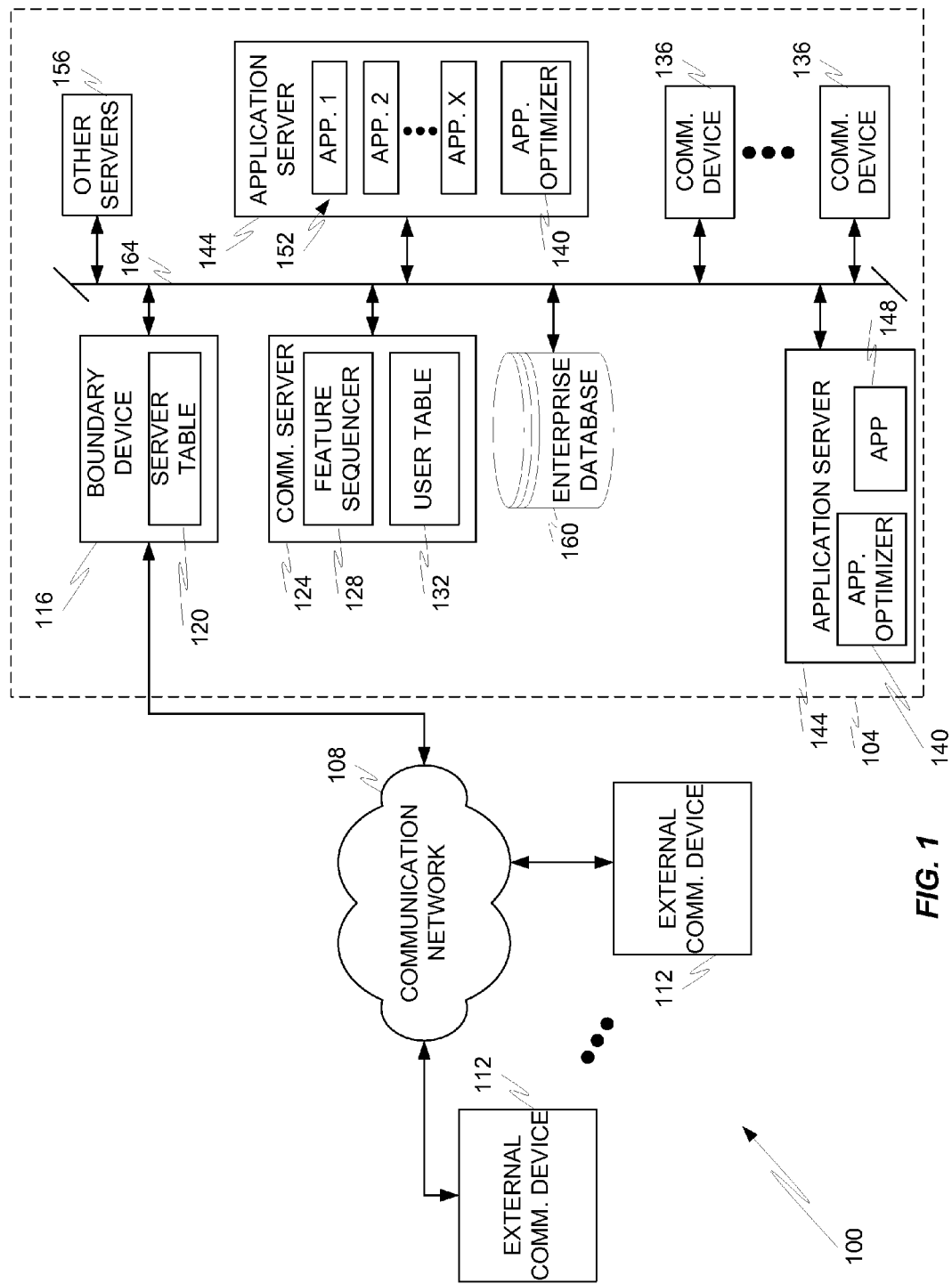
FIG. 1 is a block diagram of a communication system in accordance with embodiments of the present disclosure.

FIG. 1 depicts a communication system 100 according to an embodiment of the present disclosure. The communication system 100 may include an enterprise network 104 that is in communication, via a (typically un-trusted or unsecure or public) communication network 108, with one or more external communication devices 112. The external communication devices 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, smartphones, laptops, Personal Computers (PCs), Personal Digital Assistants (PDAs), digital phones, analog phones, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a boundary device 116 including a server table 120, a communication server 124 including a call feature sequencer 128 and a user table 132, one or more internal communication devices 136, one or more application servers 144 which may be capable of providing one application 148 or a set of different applications 152, a number of other servers 156, and an enterprise database 160, all of which are interconnected by a (trusted or secure or private) Local Area Network (LAN) 164. The application server(s) 144 may also be configured to provide an application optimizer 140 that is configured to operate as a generic B2BUA that executes commands inserted into a call-setup message by the other applications 148, 152.

It should be noted that some or all of the functions depicted in FIG. 1 may be co-hosted and/or co-resident on a single server. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108.

The communications server 124 can include a Private Branch eXchange (PBX), an enterprise switch, an enterprise server, combinations thereof, or other type of telecommunications system switch or server. The communication server 124 is preferably configured to execute telecommunication functions such as the suite of or Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and service a first subset of enterprise users whereas a second communications server 124 may be authoritative for and service a second subset of enterprise users, where the first and second subsets of users generally do not share a common user. This is one reason why the network boundary device 116 may be provided with a server table 120.

Additionally, multiple servers 124 can support a common user community. For example, in geo-redundant and other applications where users aren't necessarily bound to a single application server, there may be a cluster of equivalent servers where a user can be serviced by any server in the cluster.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104.

In some embodiments, network boundary device 116 is responsible for initially routing communications within the enterprise network 104 to the communications server 124 responsible for servicing a particular user involved in the communication. For example, if a first enterprise user is being called by an external communication device 112, then the network boundary device 116 may initially receive the inbound call, determine that the call is directed toward the first enterprise user, reference the server table 120 to identify the authoritative communications server 124 for the first enterprise user, and route the inbound call to the authoritative communications server 124. Likewise, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but this is not necessarily required. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by the communication network 108.

Each communications server 124 includes a feature sequencer 128 and a user table 132. The user table 132 for a communications server 124 contains the communication preferences for each user for which it is authoritative. In particular, the user table 132 may be provisioned by users and/or by administrative personnel. The communications preferences for a particular user are referenced by the feature sequencer 128 to determine which, if any, features (i.e., applications 148, 152) should be incorporated into a communication session for the user. The feature sequencer 128 may also be configured to determine if an application sequence can utilize an application optimizer 140 at the end of the feature sequence (e.g., as the last application on the originating side of the call and/or as the last application on the terminating side of the call). The feature sequencer 128 can actually provide communication features directly into the communication session or the feature sequencer 128 can determine an application sequence which will be invoked during set-up and used during the communication session.

In accordance with at least some embodiments, the feature sequencer 128 can determine an application sequence and cause one or more applications 148, 152 to be sequenced into a communication session. The feature sequencer 128 can also cause the application optimizer 140 to be sequenced into the application sequence if appropriate. In particular, the feature sequencer 128 is configured to analyze a particular user's communication preferences and invoke the necessary applications to fulfill such preferences. Once an application sequence is determined by the feature sequencer 128, the communications server 124 passes the communication-establishing message to a first application in the application sequence, thereby allowing the first application to determine the parameters of the communication session, insert itself into the control and/or media stream of the communication session, and thereby bind itself to the communication session (if the application is acting as a B2BUA itself). Alternatively, where the first application is acting as a proxy and the application optimizer 140 is to be utilized, the first application may alter the call-setup message by inserting one or more commands into the message and provide the altered call-setup message back to the feature sequencer 128.

Once the first application has inserted itself into the communication session, or the call-setup message has been altered as necessary, the first application either passes the call-setup message back to the feature sequencer 128 to identify the next application in the application sequence or passes the call-setup message directly to a second application in the application sequence. Alternatively, or in addition, the message may be redirected, rejected, or the like. Moreover, parties and/or media servers may be added to the call by an application. As can be appreciated, this process continues until all applications and/or the application optimizer 140 have been included in the communication session and the process can be duplicated for each of the users involved in the communication session.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 comprises a set of applications 152, one, some, or all of the applications in that set of applications 152 may be included in a particular application sequence. There is no requirement, however, that all applications in a set of applications 152 be included in an application sequence and there is no requirement as to the order in which applications are included in the application sequence, unless the application optimizer 140 is being utilized in which case the application optimizer 140 should at least be sequenced after one (and preferably two) or more proxy applications.

In some embodiments, the application sequence is usually determined based on a user's communication preferences, which can be found in the user table 132. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multi-media communications are established and conducted.

The applications (possibly including the application optimizer 140) included in a particular application sequence are generally included to accommodate the user's preferences. Applications may vary according to media-type, function, and the like. Exemplary types of applications include, without limitation, a modify "To" header application, a modify "From" header application, a changing call-id application, a hiing contact header application, a changing payload application, an EC-500 (extension to cellular) application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

The other servers 156 may comprise email servers, voicemail servers, calendaring servers, conferencing servers, presence servers, and other types of servers known to provide particular services to client devices. In some embodiments, the other servers 156 may also be considered application servers 144, which provide one or more applications for use in a communication session.

The internal communication devices 136 can be similar or identical to the external communication devices 112, except they are provisioned, and often owned, by the enterprise. Exemplary types of communication devices 112 include, without limitation, any capable phone, hardphone, softphone and/or digital telephone. Examples of suitable telephones include the 1600™, 2400™, 4600™, 5400™, 5600™, 9600™, 9620™, 9630™, 9640™, 9640G™, 9650™, and Quick Edition™ telephones, IP wireless telephones (such as Avaya Inc.'s IP DECT™ phones), video phones (such as Avaya Inc.'s Videophone™), and softphones of Avaya, Inc.

The enterprise database 160 includes enterprise subscriber information, such as name, job title, electronic address information (e.g., telephone number, email address, instant messaging handle, direct dial extension, and the like), subscriber contact lists (e.g., contact name and electronic address information), other employee records, and the like.

Figure 2:
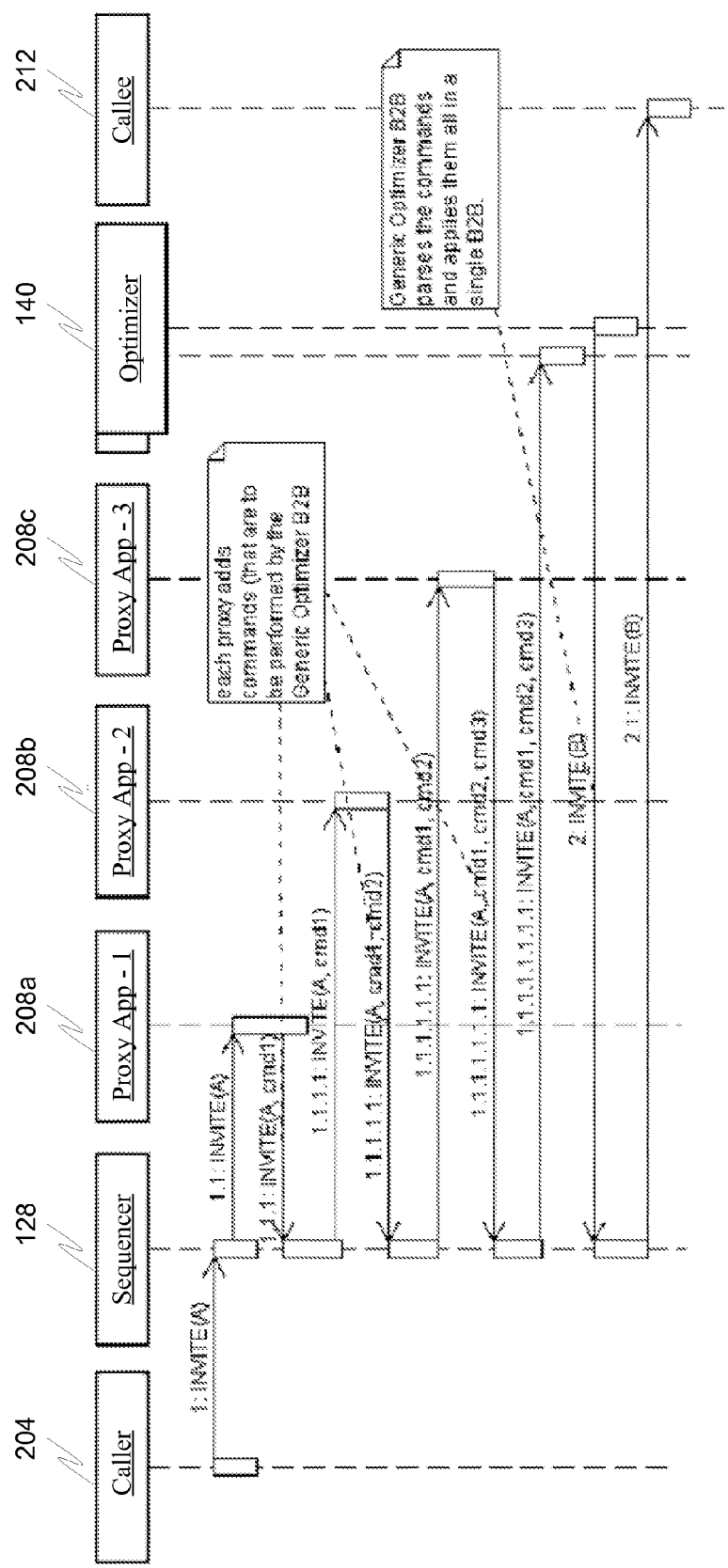
FIG. 2 is a sequence diagram depicting a message flow in accordance with embodiments of the present disclosure.

Referring now to FIG. 2, a sequence diagram depicting a non-limiting example of a message flow during call setup (on either the originating or terminating side of the call) will be described in accordance with embodiments of the present disclosure. Specifically, the sequence diagram depicts an application sequence that has been defined to include four applications with the application optimizer 140 being defined as the last application in the sequence.

Initially, a first call-setup message is received at the feature sequencer 128 from a caller 204 (step 1). The first call-setup message may correspond to a first INVITE message and may be transmitted in response to the caller 204 dialing a number of a callee 212. One or both of the caller 204 and callee 212 may be utilizing a communication device 136. In some embodiments, one of the caller 204 and callee 212 may be utilizing an external communication device 112. In some embodiments, a conference call may be established, even though FIG. 2 only depicts a two party call. Thus, the sequence depicted in FIG. 2 may represent a message flow for a single leg (e.g., between parties A and B) of a multiparty conference call (e.g., between parties A, B, and C).

Upon receiving the first call-setup message, the feature sequencer 128 refers to the user table 132 to determine the originating (or terminating) application sequence for the caller 204 (or callee 212). The feature sequencer 128 analyzes the determined application sequence and determines that the first application in the sequence is the first proxy application 208*a*. The feature sequencer 128 then sends the first call-setup message to the first proxy application 208*a* (step 1.1). The first call-setup message may be sent to the first proxy application 208*a* following the SIP ISC interface specification.

The first proxy application 208*a* may need to perform an action that involves functionality that only a B2BUA can perform. In this scenario, the first proxy application 208*a* modifies the first call-setup message to create a second call-setup message. In particular, the first proxy application 208*a* may populate a new header with a command (e.g., cmd1) and return the second call-setup message (having the new header inserted into the message) back to the feature sequencer 128 (step 1.1.1).

The feature sequencer 128 then looks up the next application in the sequence and determines that the next application in the sequence is a second proxy application 208*b*. Upon making this determination, the feature sequencer 128 sends the second call-setup message to the second proxy application 208*b* (step 1.1.1.1). In an alternative implementation, the feature sequencer 128 may initially determine the entire application sequence and send the first call-setup message to the first application with instructions to forward the call-setup message to the second application when the first application is finished processing the call-setup message. In this implementation it may not be necessary to have the call-setup message be re-sent back to the feature sequencer 128 by each application in the sequence.

When the second proxy application 208*b* receives the second call-setup message and like the first proxy application 208*a*, the second proxy application 208*b* has one or more actions that it needs to perform and those actions may only be implemented by a B2BUA. Accordingly, the second proxy application 208*b* modifies the second call-setup message to create a third call-setup message. In particular, the second proxy application 208*b* may populate a new header with a command (e.g., cmd2) and return the third call-setup message (having the new header inserted into the message) back to the feature sequencer 128 (step 1.1.1.1.1).

The feature sequencer 128 again looks up the next application in the sequence and determines that the next application in the sequence is a third proxy application 208*c*. Upon making this determination, the feature sequencer 128 sends the third call-setup message to the third proxy application 208*c* (step 1.1.1.1.1.1).

When the third proxy application 208*c* receives the third call-setup message (whether from the feature sequencer 128 or from the second proxy application 208*b* ) and like the previous proxy applications, the third proxy application 208*c* has one or more actions that it needs to perform and those actions may only be implemented by a B2BUA. Accordingly, the third proxy application 208*c* modifies the third call-setup message to create a fourth call-setup message. In particular, the third proxy application 208*c* may populate a new header with a command (e.g., cmd3) and return the fourth call-setup message (having the new header inserted into the message) back to the feature sequencer 128 (step 1.1.1.1.1.1.1).

Thereafter, the feature sequencer 128 identifies the last application in the sequence as the application optimizer 140 and sends the fourth call-setup message to the application optimizer 140 (step 1.1.1.1.1.1.1.1).

The application optimizer 140 receives the fourth call-setup message and parses the message, identifies the commands contained within the message, and executes the commands (e.g., cmd1, cmd2, and cmd3). Specifically, the application optimizer 140 executes the commands as a single B2BUA before returning control back to the feature sequencer 128 (step 2). It should be appreciated that this is a much more efficient use of processing resources as compared to having each of the previous application operate as individual B2BUAs. Upon receiving the call-setup message back from the application optimizer 140, the feature sequencer 128 routes the call according to its own routing rules (step 2.1). In the embodiment depicted in FIG. 2, the feature sequencer 128 routes the call directly to the callee 212.

It should be noted however, that if the application sequence depicted in FIG. 2 was on the originating side (e.g., was for the caller 204), then the feature sequencer 128 may either route the call-setup message to an authoritative communication server 124 for the callee 212. Alternatively, if the feature sequencer 128 is authoritative for the callee 212, then the feature sequencer 128 can repeat the process for the terminating side of the call (e.g., according to the call preferences of the callee 212).

Figure 3:
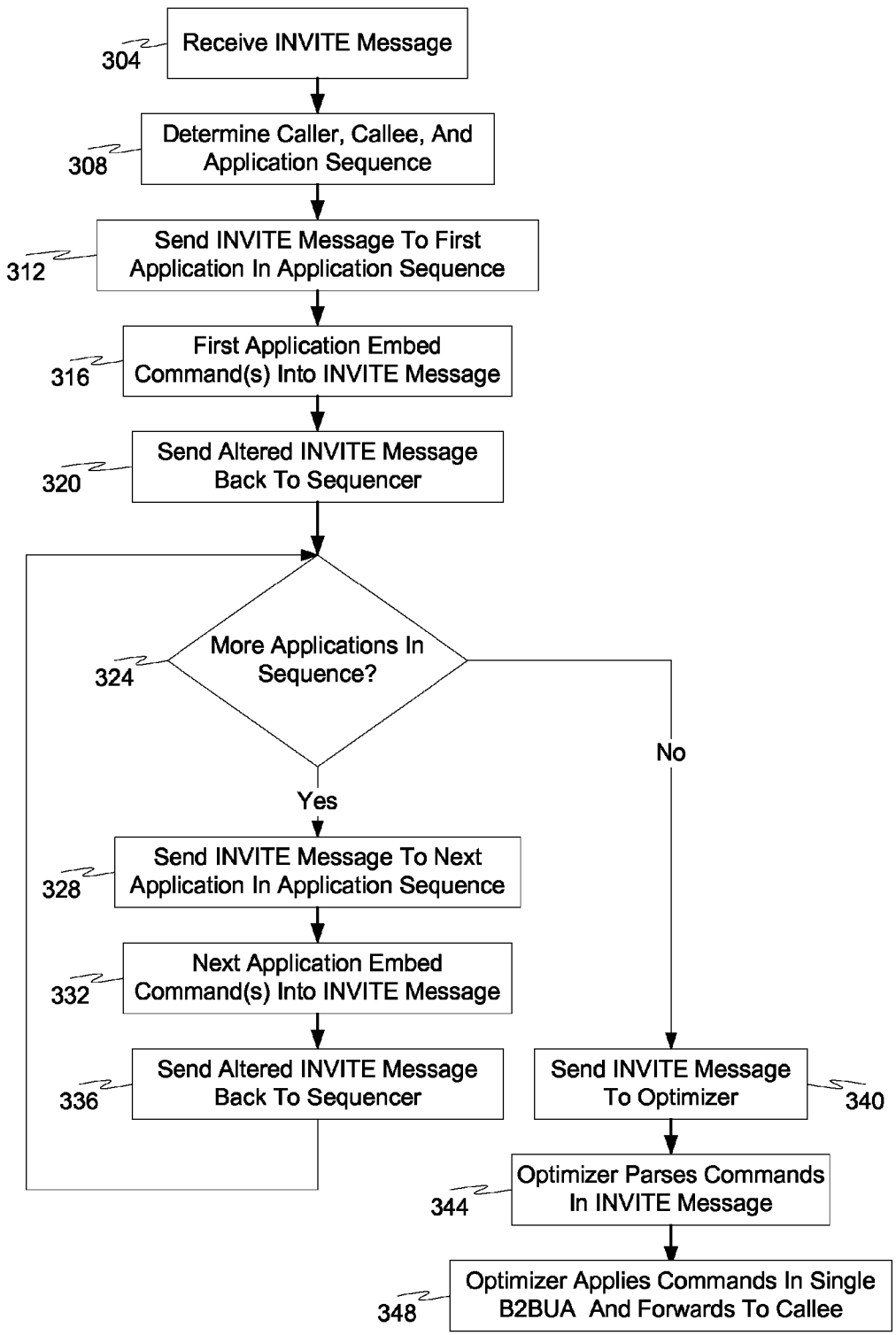
FIG. 3 is a flow diagram depicting an application sequencing process in accordance with embodiments of the present disclosure.

With reference now to FIG. 3, a flow diagram depicting an application sequencing process will be described in accordance with embodiments of the present disclosure. The process begins when an INVITE message is received at a feature sequencer 128 that is configured to determine an application sequence for either a party that originated a call (or other type of communication session) or a party that is the target of the call (step 304). Thus, in a system 100 employing the half-call model, the process depicted in FIG. 3 may be executed on the originating side of the call and/or the terminating side of the call. Upon receiving the INVITE message, the feature sequencer 128 identifies the caller, callee, and the appropriate application sequence for the call (step 308). Some or all of this information may be obtained from the user table 132 and/or the enterprise database 160.

Upon determining the appropriate application sequence, the feature sequencer 128 sends the INVITE message to the first application in the application sequence (step 312). The first application receives the INVITE message and embeds one or more commands for executing the functionality of the first application into the INVITE message (step 316). Thereafter, the first application either returns the INVITE message with the one or more commands back to the feature sequencer 128 or it sends the INVITE message on to the next application in the application sequence (step 320).

The determination is then made as to whether or not additional applications are to be included in the application sequence (step 324). If the query is answered affirmatively, the method proceeds with the INVITE message being sent to the next application in the application sequence (step 328). The next application receives the INVITE message and embeds one or more commands for executing the functionality of the next application into the INVITE message (step 332). The altered INVITE message is then sent back to the feature sequencer 128 or the next application in the sequence (if any) (step 336). This loop continues until the query of step 324 is answered negatively.

After all proxy applications in the application sequence have had a chance to embed their command(s) into the INVITE message, the feature sequencer 128 sends the INVITE message containing the command(s) to the application optimizer 140 (step 340). The application optimizer 140 then parses the command(s) embedded within the INVITE message (step 344) and executes the command(s) as a single B2BUA (step 348). The process may then conclude by submitting the INVITE message to the destination device or by implementing the same process for the terminating side of the call. At this point the application optimizer 140 is now in the call path like a B2BUA. This allows the application optimizer 140 to perform functions like call recording and other B2BUA functions.

In the foregoing description, for the purposes of illustration, methods were described in a particular order. It should be appreciated that in alternate embodiments, the methods and steps thereof may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
    receiving, at a first application in an application sequence, a call-setup message;
    embedding, by the first application, at least one command comprising a first set of instructions to be executed into the call-setup message to create a first modified call-setup message;
    receiving, at a second application in the application sequence, the first modified call-setup message;
    embedding, by the second application, at least one command comprising a second set of instructions to be executed into the first modified call-setup message to create a second modified call-setup message;
    receiving, at an application optimizer, the second modified call-setup message; and
    executing, by the application optimizer, the commands comprising the first and the second set of instructions to be executed embedded in the second modified call-setup message by the first and second applications.

2. The method of claim 1, wherein the first and second applications are proxy applications and wherein the application optimizer executes the commands embedded in the second modified call-setup message as a single Back-to-Back User Agent.

3. The method of claim 1, wherein the application optimizer performs functions of the first and second applications by executing the commands embedded in the second modified call-setup message.

4. The method of claim 1, wherein the call-setup message comprises an INVITE message.

5. The method of claim 1, wherein the application sequence is determined based on call preferences of a caller that originated the call-setup message and wherein the application optimizer is the last application in the application sequence.

6. The method of claim 1, wherein the application sequence is determined based on call preferences of a callee that is the target of the call-setup message and wherein the application optimizer is the last application in the application sequence.

7. The method of claim 1, wherein the commands embedded in the second modified call-setup message by the first and second applications are located in a header of the second modified call-setup message.

8. A non-transitory computer readable medium having stored thereon instructions that cause a computing device containing the computer readable medium to execute a method, the instructions comprising:
   instructions configured to parse a call-setup message; and
   wherein the call-setup message comprises commands, the commands comprising instructions to be executed;
   wherein the commands are embedded in the call-setup message by one or more proxy applications in an application sequence;
   wherein at least one command embedded in the call-setup message has been modified by at least one of the one or more proxy applications different from the one or more proxy applications performing the embedding of the commands; and
   instructions to execute each of the commands embedded in the call-setup message as a single Back-to-Back User Agent.

9. The non-transitory computer readable medium of claim 8, wherein the instructions to execute the commands enables functions of the one or more proxy applications to be performed as the single Back-to-Back User Agent.

10. The non-transitory computer readable medium of claim 8, wherein the call-setup message comprises an INVITE message.

11. The non-transitory computer readable medium of claim 8, wherein the commands are embedded in a header of the call-setup message.

12. The non-transitory computer readable medium of claim 8, wherein the commands cause one or more of the following functions to be performed: modify a "to" header of the call-setup message;
   modify a "from" header of the call-setup message; change caller identification information associated with the call-setup message; hide the contact header; and change payload of the call-setup message.

13. The non-transitory computer readable medium of claim 8, further comprising instructions configured to forward the call-setup message to a callee identified in the call-setup message or a communication server that is authoritative for the callee.

14. The non-transitory computer readable medium of claim 8, wherein the instructions to execute each of the commands further comprise instructions to cause an application optimizer to execute each of the commands.

15. A communication system, comprising:
   at least one microprocessor, wherein the at least one microprocessor is configured to execute a first communication application configured to embed a first computer-executable command comprising a first set of instructions to be executed into a call-setup message, wherein the first computer-executable command includes instructions for performing a first function of the first communication application;
   wherein the at least one microprocessor is further configured to execute a second communication application configured to embed a second computer-executable command comprising a second set of instructions to be executed into the call-setup message, wherein the second computer-executable command includes instructions for performing a second function of the second communication application; and
   wherein the at least one microprocessor is configured to execute an application optimizer configured to execute the first and second computer-executable commands comprising the first and the second set of instructions to be executed on behalf of the first and second communication applications as a single Back-to-Back User Agent.

16. The system of claim 15, wherein the first and second communication applications comprise proxy-based applications.

17. The system of claim 15, wherein the first communication application is first in an application sequence, wherein the second communication application is second in the application sequence, and wherein the application optimizer is last in the application sequence.

18. The system of claim 15, wherein the first and second applications are hosted on a single processor of the at least one microprocessor of the communication system.

19. The system of claim 15, wherein the first application embeds the first computer-executable command as a first SIP header and wherein the second application embeds the second computer-executable command as a second SIP header.

20. The system of claim 15, wherein execution of the first and second computer-executable commands causes the application optimizer to behave as the first and second applications.

* * * * *